United States Patent
Chaudhuri

(10) Patent No.: US 9,933,996 B2
(45) Date of Patent: Apr. 3, 2018

(54) SELECTIVELY COMBINABLE SHIFTERS

(71) Applicant: Wave Semiconductor, Inc., Sunnyvale, CA (US)

(72) Inventor: Samit Chaudhuri, Cupertino, CA (US)

(73) Assignee: Wave Computing, Inc., Campbell, CA (US)

( * ) Notice: Subject to any disclaimer, the term of this patent is extended or adjusted under 35 U.S.C. 154(b) by 265 days.

(21) Appl. No.: 14/136,754

(22) Filed: Dec. 20, 2013

(65) Prior Publication Data

US 2014/0181164 A1    Jun. 26, 2014

Related U.S. Application Data

(60) Provisional application No. 61/740,418, filed on Dec. 20, 2012.

(51) Int. Cl.
*G06F 5/01* (2006.01)

(52) U.S. Cl.
CPC ............... *G06F 5/01* (2013.01); *G06F 5/015* (2013.01)

(58) Field of Classification Search
CPC .................................... G06F 5/01; G06F 5/015
See application file for complete search history.

(56) References Cited

U.S. PATENT DOCUMENTS

| | | | |
|---|---|---|---|
| 6,275,834 B1 * | 8/2001 | Lin ........................... | G06F 5/01 708/209 |
| 6,301,600 B1 | 10/2001 | Petro et al. | |
| 6,308,189 B1 * | 10/2001 | Nguyen ................... | G06F 5/015 708/209 |
| 7,730,118 B2 | 6/2010 | Kurd | |
| 8,224,883 B2 | 7/2012 | Pedersen et al. | |
| 8,229,992 B2 | 7/2012 | Belluomini et al. | |
| 8,244,790 B2 | 8/2012 | Satoh et al. | |
| 8,270,558 B2 | 9/2012 | Dielissen | |
| 8,291,002 B2 | 10/2012 | Craske | |
| 2003/0023646 A1 * | 1/2003 | Lin ........................... | G06F 7/76 708/209 |
| 2007/0088772 A1 * | 4/2007 | Nunes ..................... | G06F 5/017 708/209 |

OTHER PUBLICATIONS

Chou, Christopher H., et al. "VEGAS: soft vector processor with scratchpad memory." Proceedings of the 19th ACM/SIGDA international symposium on Field programmable gate arrays. ACM, 2011.

(Continued)

*Primary Examiner* — Chuong D Ngo
(74) *Attorney, Agent, or Firm* — Adams Intellex, PLC

(57) ABSTRACT

An apparatus for mathematical manipulation is described allowing the selective combination of shifters to shift binary numbers of various widths. Selective combination allows on-the-fly adjustment of shifters from independent to coordinated shifting operations. Selective combination allows adjustable hardware-based shifting while saving space and resources. Multiple eight-bit shifters can be configured for a variety of operand widths, such as a 32-bit width, a 24-bit width, a 16-bit width, or an eight-bit width. Multiplexers route the appropriate input data to the appropriate shifters. Opcodes configure the shifters for the desired type of shift and a shifted result is generated.

18 Claims, 6 Drawing Sheets

(56) References Cited

OTHER PUBLICATIONS

Erle, Mark A., Michael J. Schulte, and Brian J. Hickmann. "Decimal floating-point multiplication via carry-save addition." Computer Arithmetic, 2007. ARITH'07. 18th IEEE Symposium on. IEEE, 2007.

Pillmeier, Matthew R., Michael J. Schulte, and Eugene G. Walters III. "Design alternatives for barrel shifters." Proceedings of SPIE—Advanced Signal Processing Algorithms, Architectures, and Implementations XII 4791 (2002): 436-447.

* cited by examiner

SELECTIVELY COMBINABLE SHIFTERS

RELATED APPLICATIONS

This application claims the benefit of U.S. provisional patent application "Selectively Combinable Shifters" Ser. No. 61/740,418, filed Dec. 20, 2012. The foregoing applications are each hereby incorporated by reference in their entirety.

FIELD OF ART

This application relates generally to logic circuitry and more particularly to selectively combinable shifters.

BACKGROUND

The ability to perform sophisticated vector and scalar arithmetic operations in real time is an important aspect of computer systems. Often, however, this requirement is also accompanied by physical constraints upon the size, weight, power, and cooling of the computer system. System designers must privilege certain components and features when producing a computer system, thus compromise between competing design requirements is an inevitable part of modern systems design. In many cases, this compromise results in processors with less than adequate performance. As mobile computing becomes more prevalent, issues such as circuit size and power consumption take on an increasingly greater importance.

Digital electronic circuitry often operates on information contained in many parallel data bits. To perform mathematical operations within digital electronic circuitry, it is often necessary to shift these data bits left or right by a selected number of bit positions. The ability to manipulate the position of binary data bits in a parallel data word is required for a large number of binary operations, including arithmetic operations such as multiplication and division.

Further, data within a computer or other digital circuit is typically organized into one or more standard data sizes, referred to as data words. For example, a common data word size contains 32 bits of binary data. The size of a data word affects the precision and/or resolution of the information contained within the digital circuit, with larger data sizes allowing greater precision and/or resolution because they can represent more values. However, larger data words require larger digital circuits to manipulate the data, leading to greater cost, required area, and complexity. In addition to manipulating data of a maximum possible size, a computing system may also need to manipulate data of smaller, evenly divided sizes. For example, a computer system with a maximum data word size of 32 bits might also manipulate eight-bit or 16-bit data.

Some shifters can shift bits left or right by a predetermined amount. Different types of shifts are possible; for example, an arithmetic shift is used to multiply or divide a binary value by a factor that is a power of two while preserving the arithmetic sign of the value. Another type of shift, a so called logical shift, serves to move bit patterns of the binary value or word to the left or right within the word in order to reposition a series of bits from the lower half to the upper half of the word.

A shifter also includes control signals for performing the loading of a binary input word and performing the shifting of the binary word to the right or left by a specified number of bits. Also, new data—such as a new bit value to take the place of a bit value being shifted away from either the left or right edges of the computer word within the shifter—can be specified. Even in a rapidly changing era of computer system design, shifters continue to serve as fundamental building blocks for a wide variety of digital logic circuits in various applications.

SUMMARY

Shifter circuits are used for a variety of purposes including mathematical manipulation. A few of the numerous applications utilizing shifter circuits include general computing, video rendering, cryptography, and communications. Different operations may require shifters of different sizes. For example, in some cases it may be desirable to operate on 32-bit data words, while in other situations, operating on an eight-bit or 16-bit data word may be necessary. Embodiments of the present concept provide a novel, selectively combinable shifter. Multiple shifters are configured such that they may be cascaded together to operate on larger word sizes, or configured to operate on the smallest word size (e.g. 8-bits). In this way, the total amount of hardware for a given design may be reduced, an important quality in applications where power consumption and physical size are key design factors, such as mobile computing. An apparatus for mathematical manipulation is disclosed comprising: a first port coupled to a first shifter wherein the first port has a first width; a second port coupled to a second shifter wherein: the second port has a second width, and wherein: the second shifter can be selectively coupled to the first shifter; the first port and the second port can be used in combination to handle input of a binary number of a third width wherein the third width is less than or equal to a sum of the first width and the second width; and the first shifter in combination with the second shifter can be configured to shift the binary number of the third width. The first shifter can be configured to shift a binary number of the first width and the second shifter can be configured to shift a binary number of the second width wherein the binary number of the first width and the binary number of the second width are different values.

In embodiments, a method of logical calculation comprises: configuring a first shifter and a second shifter wherein: the first shifter is coupled to a first port that has a first width and the second shifter is coupled to a second port that has a second width wherein: the second shifter can be selectively coupled to the first shifter; the first port and the second port can be used in combination to handle input of a binary number of a third width wherein the third width is less than or equal to a sum of the first width and the second width; and the first shifter in combination with the second shifter can be configured to shift the binary number of the third width. In some embodiments, a computer-implemented method for implementation of a logical calculation apparatus comprises: implementing a first shifter coupled to a first port wherein the first port has a first width; implementing a second shifter coupled to a second port wherein: the second port has a second width; the second shifter can be selectively coupled to the first shifter; the first port and the second port can be used in combination to handle input of a binary number of a third width wherein the third width is less than or equal to a sum of the first width and the second width; and the first shifter in combination with the second shifter can be configured to shift the binary number of the third width. In embodiments, a computer program product embodied in a non-transitory computer readable medium for implementation of a logical calculation apparatus comprises: code for implementing a first shifter coupled to a first port wherein the first port has a first width; code for implementing a second shifter coupled to a second port wherein: the second port has a second width; the second shifter can be selectively coupled to the first shifter; the first port and the second port can be used in combination to handle input of a binary number of a third width wherein the third width is less than or equal to a sum of the first width and the second width; and the first shifter in combination with the second shifter can be configured to shift the binary number of the third width. In some embodiments, a computer system for implementation of a logical calculation apparatus comprises: a memory which stores instructions; one or more processors coupled to the memory wherein the one or more processors are configured to: implement a first shifter coupled to a first port wherein the first port has a first width; implement a second shifter coupled to a second port wherein: the second port has a second width; the second shifter can be selectively coupled to the first shifter; the first port and the second port can be used in combination to handle input of a binary number of a third width wherein the third width is less than or equal to a sum of the first width and the second width; and the first shifter in combination with the second shifter can be configured to shift the binary number of the third width.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Shifter circuits are used to perform mathematical operations quickly via hardware, in contrast to performing such manipulations in software. Different mathematical operations may require shifters of different sizes. For example, some operations may require or suggest the use of 32-bit data values while other operations may require the use of eight-bit or 16-bit data values. However, implementing different shifter circuits for eight-bit, 16-bit, and 32-bit value sizes increases the amount of circuitry required, and thus also increases the size, power consumption, and cost of a device. This seeming contradiction between speed and hardware size reveals the need for a selectively combinable shifter. In the selectively combinable shifter disclosed herein, hardware comprising multiple shifters is reconfigured to accommodate operands of varying sizes. Hence, the device count is reduced, thereby saving power, lowering costs, and reducing circuit sizes while still providing flexibility for shifting 32-bit data values, 16-bit data values, and eight-bit data values.

Figure 1:
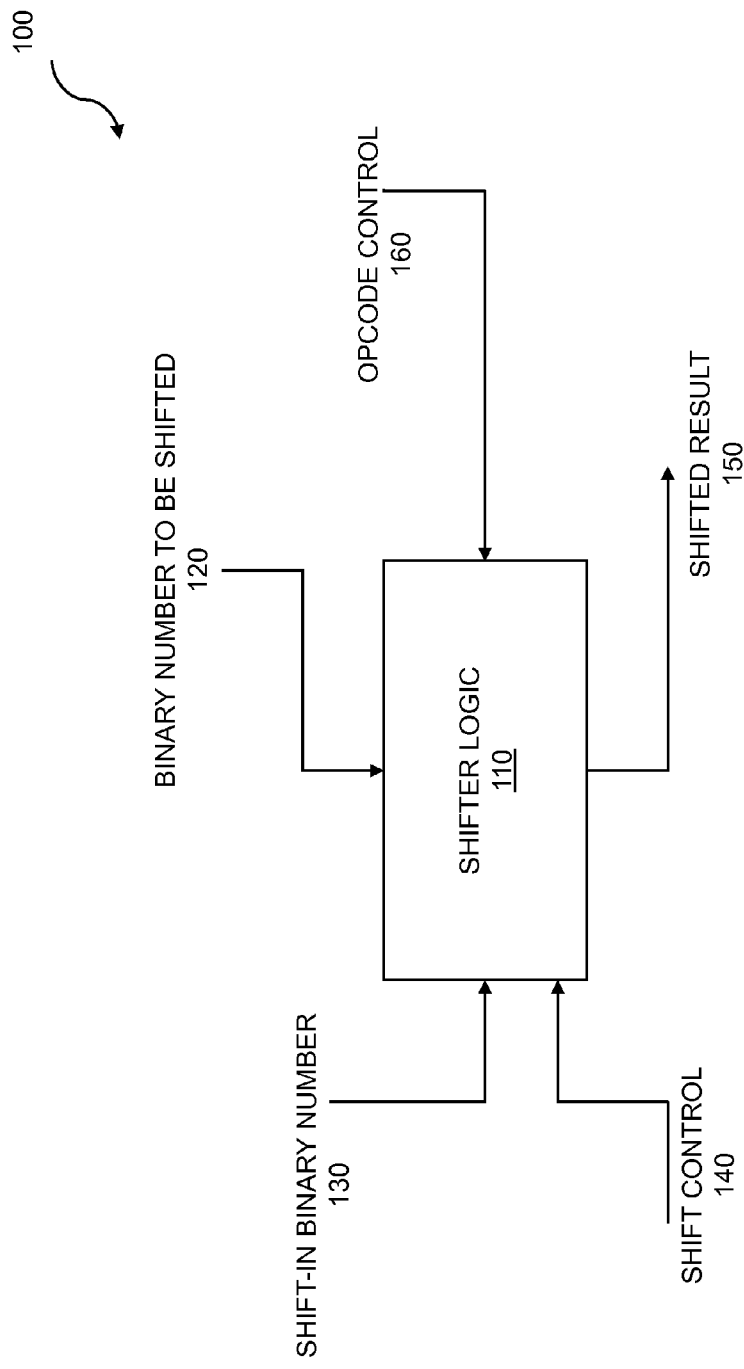
FIG. 1 is a block diagram of a shifter circuit.

FIG. 1 is a block diagram of a shifter circuit 100. The circuit 100 comprises a logical calculation apparatus for mathematical manipulation. In this diagram, shifter logic 110 receives a binary number to be shifted 120. The binary number to be shifted 120 is sent to shifter logic 110 via a serial data line or parallel data lines, depending on the embodiment. A shift-in binary number 130 can also be input to shifter logic 110. The shift-in binary number 130 is sent to shifter logic 110 via a serial data line or parallel data lines, depending on the embodiment. Shift control 140 is input to shifter logic 110 to configure it for the desired size of the shift operation (e.g. 64-bit, 32-bit, 16-bit, 8-bit), and also can include configuration of the number of bits to shift, as well as clock signals for controlling the rate and synchronization of the shifting. In embodiments, opcode control 160 is an instruction-set input to shifter logic 110. The instruction set can comprise instructions specifying the direction of the shift (e.g. right shift or left shift), and the action required to replace shifted-out bits. For example, as bits are shifted out of the shifter logic 110, new data from a shift-in binary number 130 can be used to replace those bits. Alternatively, a predetermined pad value—such as a binary 0, binary 1, or another data pattern—can be used to replace shifted bits. In embodiments, the shifted result 150 is output from shifter logic 110.

Figure 2:
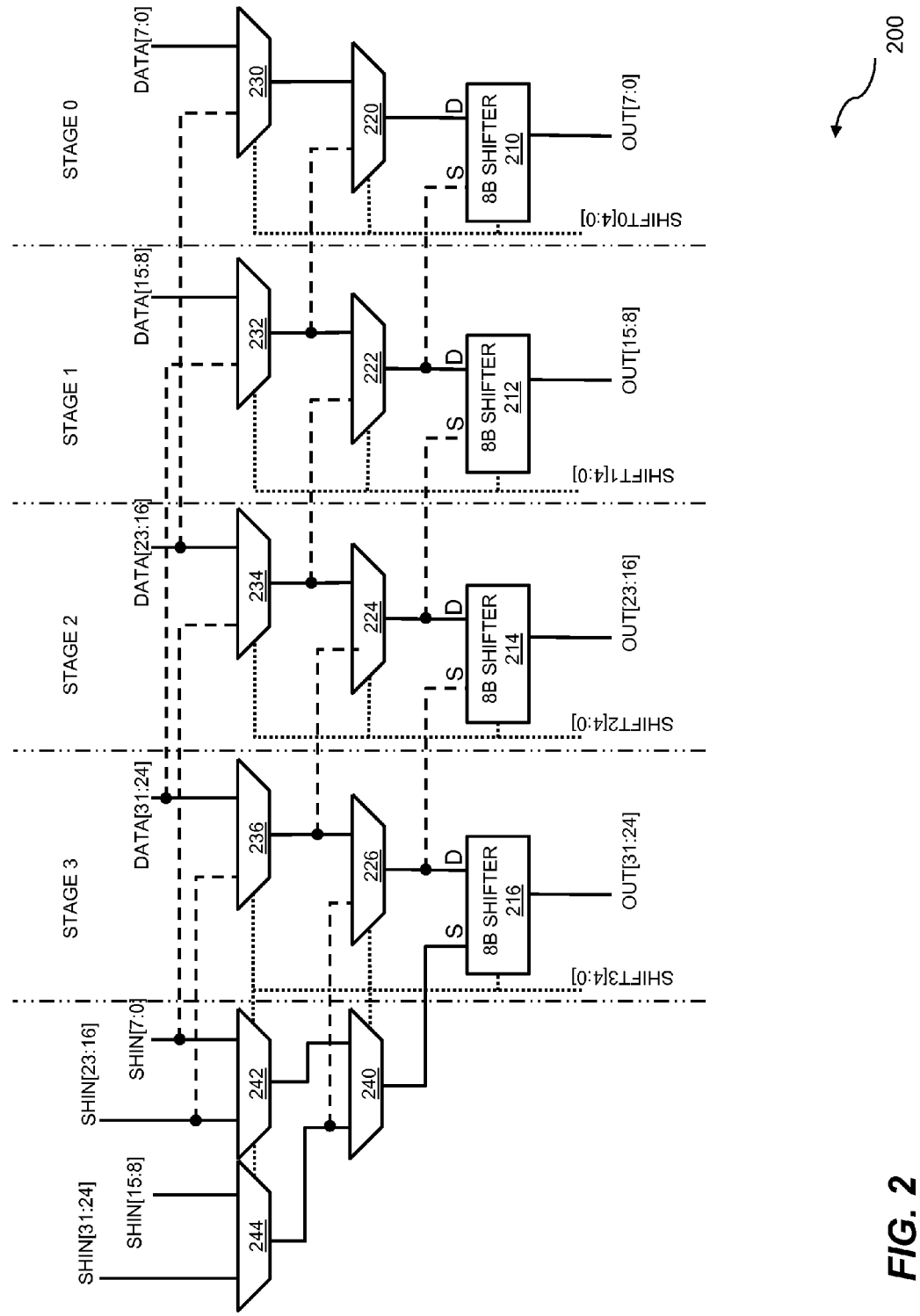
FIG. 2 is a logic diagram of selectively combinable shifters.

FIG. 2 is a logic diagram of selectively combinable shifters. The apparatus 200 comprises logic for mathematical manipulation. The arrangement of apparatus 200 should be considered an example and not taken in any way as a limitation. The apparatus 200 shows four stages, indicated by labels "Stage 0," "Stage 1," "Stage 2," and Stage "3." Each stage comprises an individual eight-bit shifter. "Stage 0" comprises a shifter 210. "Stage 1" comprises another shifter 212, while "Stage 2" comprises a third shifter 214, and "Stage 3" comprises a fourth shifter 216. In embodiments, the third shifter 214 and the fourth shifter 216 are coupled to the first shifter 210 and the second shifter 212. The stages can be configured to operate together on a 32-bit value. Alternatively, the stages may be configured to operate on four eight-bit values, two 16-bit values, or an eight-bit value and a 24-bit value. In some embodiments, additional stages may be added to enable manipulation of 64-bit, 128-bit, or larger data words.

The eight-bit shifters each have output signals. The first shifter 210 has an output signal OUT[7:0]. The second shifter 212 has an output signal OUT[15:8]. The third shifter 214 has an output signal OUT[23:16], and the fourth shifter 216 has an output signal OUT[31:24].

Each eight-bit shifter has a shift-control input signal port. The first shifter 210 has a shift-control signal SHIFT0[4:0]. The second shifter 212 has a shift-control signal SHIFT1[4:0]. The third shifter 214 has a shift-control signal SHIFT2[4:0]. The fourth shifter 216 has shift-control signal SHIFT3[4:0]. In the example shown, each shift signal contains five bits. Three bits are used to specify the amount of shift (zero to eight bits) within the shifters. The remaining two bits are used to control the selection of the two multiplexers used in each stage.

In general, each eight-bit shifter (for example, the first eight-bit shifter 210) has two input ports. There is an eight-bit data input port "D" which receives an initial value, and an eight-bit shift-in input port "S" which allows a data value used for replacing shifted bits. In some embodiments, a specified data value (e.g. "0") simply takes the place of the shifted bits, thus replacing or "padding" for shifted bits. In other words, when there is a shift to the right, for example, "0s" are inserted or "padded" on the left to replace the shifted bits. The data inputs to the four shifters comprise input signals DATA[7:0], DATA[15:8], DATA[23:16], and DATA[31:24]. The shift-in inputs to the four shifters comprise input signals SHIN[7:0], SHIN[15:8], SHIN[23:16], and SHIN[31:24]. In embodiments, a plurality of multiplexers (for example, multiplexer 220 and multiplexer 230 for "stage 0") are used to route the appropriate data and shift-in signals to the appropriate eight-bit shifter, depending on the desired configuration and operation. Each multiplexer is controlled by shift-control signals. A multiplexer 220 and another multiplexer 230 of "Stage 0" are controlled by a shift-control signal SHIFT0[4:3]. A multiplexer 222 and another multiplexer 232 of "Stage 1" are controlled by a shift-control signal SHIFT1[4:3]. A multiplexer 224 and another multiplexer 234 of "Stage 2" are controlled by a shift-control signal SHIFT2[4:3]. A multiplexer 226 and another multiplexer 236 of "Stage 3" are controlled by a shift-control signal SHIFT3[4:3]. Shift-in signals SHIN[31:0] are input to a multiplexer 240, another multiplexer 242, and a third multiplexer 244 for routing to the appropriate eight-bit shifters. The embodiment depicted in FIG. 2 is a right shifter. However, left shifters and bi-directional shifters are possible in other embodiments of the present concept.

The apparatus 200 includes a first port "D" coupled to a first shifter 210 wherein the first port has a first width. The apparatus 200 includes a second port "D" coupled to a second shifter 212. In this embodiment, the second shifter has a second width. The second shifter can be selectively coupled to the first shifter. The first port and the second port can be used in combination to handle the input of a binary number of a third width wherein the third width is less than or equal to a sum of the first width and the second width. In embodiments, the first width and the second width are the same. The first width and the second width can each be eight bits. The first shifter in combination with the second shifter can be used to shift the binary number of the third width. The first shifter may include a barrel shifter. The first shifter can include configuration logic to enable simultaneous shifting of more than one bit.

The apparatus 200 can include a first shift-in port SHIN [7:0] for the first shifter 210. The apparatus 200 can include padding a shifted number with zeros. In embodiments, a shift-in port is tied to zero or another data state. In embodiments, there is no shift-in port for a shifter and the shifted data is padded with a zero or another data state. In some embodiments, multiplexers (not shown) can be included in the apparatus 200 so that the shift-in port is selectively tied to zero or another data state when a shifter stage is used independently from the next shifter stage. In this case, the multiplexers could be on the signal lines going to respective "S" inputs where the multiplexers are at the logical boundary between one stage and the next, e.g. between Stage 0 and Stage 1. In some embodiments, the multiplexors (i.e. 240, 242, 244) are not needed when padding of zeros, or another data state, is planned. The apparatus 200 can allow the first shifter 210, in combination with the second shifter 212, to shift the binary number of the third width by a shift value greater than the second width. The apparatus 200 can allow configuration of the first shifter 210 so that, in combination with the second shifter 212, the shifters pad the shifted number with zeros. The apparatus 200 can include a second shift-in port for the second shifter 212. The apparatus 200 can include additional configuration logic to enable shifting of bits from the second shifter 212 to the first shifter 210. The apparatus 200 can include a processing element to control at least the first shifter. The apparatus 200 can include a processing element to control at least the second shifter. A processing element may include a CPU or portion thereof. In embodiments, the apparatus 200 includes added configuration logic wherein the first shifter 210, the second shifter 212, the third shifter 214, and the fourth shifter 216 are configured to shift a 32-bit binary number.

In an example of a 32-bit operation, data from a data input DATA[7:0] is routed through the multiplexer 230 and the multiplexer 220 into the data input "D" of shifter 210. Data from another data input DATA[15:8] is routed through the multiplexer 232 into the data input "D" of shifter 212, as well as to the shift-in input "S" of the first shifter 210. Data from a third data input DATA[23:16] is routed through the multiplexer 234 into the data input "D" of a shifter 214, as well as into the shift-in input "S" of the second shifter 212 or the first shifter 210. Data from a fourth data input DATA[31:24] is routed through the multiplexer 236 and the multiplexer 226 into the data input "D" of the fourth shifter 216, as well as to the shift-in input "S" of the third shifter 214, the second shifter 212, or the first shifter 210. The shift-in signals are routed through the multiplexers to the various eight-bit shifters. A shift input signal SHIN[31:24] and another shift input signal SHIN[15:8] are routed to the multiplexer 244. A shift input signal SHIN[23:16] and another shift input signal SHIN[7:0] are routed to another multiplexer 242. The first multiplexer 244 and the second multiplexer 242 both input to the multiplexer 240, which in turn feeds into the shift-in input "S" of the fourth shifter 216. The shift input signal SHIN[23:16] is also routed to the multiplexer 236. The shift input signal SHIN[7:0] is also routed to the multiplexer 234.

The SHIN signals can be routed to the appropriate shifter depending on how many bits are to be shifted. This is accomplished by setting the multiplexer input selection accordingly. For example, in the case of a right shift operation where a 32-bit value is shifted "n" bits, where n=2, then the SHIN[1:0] signal is routed to the leftmost two bits of the eight-bit shift-in input port "S" of the fourth shifter 216. In another example case where a 32-bit value is shifted by ten bits, i.e. where n=10, ten bits from two bytes of shift-in data are needed. The SHIN[1:0] signals are routed, through multiplexer 226 and multiplexer 236, to the upper two bits of the "S" input for the third shifter 214. The SHIN[7:2] signals are routed, through multiplexer 240 and multiplexer 242, to the lower six bits of the "S" input for the fourth shifter 216. The SHIN[9:8] signals are routed, through multiplexer 240 and multiplexer 244, to the upper two bits of the "S" input for the fourth shifter 216.

In some embodiments of a 16-bit operation, only two stages are used (e.g. stage 1 and stage 0). The signal DATA[7:0] is routed through the multiplexer 230 and the multiplexer 220 into the data input "D" of the first shifter 210. The signal DATA[15:8] is routed through the multiplexer 232 and the multiplexer 222 into the data input "D" of the second shifter 212, as well as into the shift-in input "S" of the first shifter 210. For shifts of eight bits or less, the signal SHIN[7:0] is routed to the shift-in input "S" of the second shifter 212. For shifts of more than eight bits, the signal SHIN[23:16] serves as the high byte of the shift-input for the configuration of "Stage 1" and "Stage 0" as a 16-bit shifter.

Alternatively, "Stage 3" and "Stage 2" can be configured as a 16-bit shifter. For example, in a shift of eight bits, the signal DATA[31:24] is routed through the multiplexer 236 and the multiplexer 226 into the shift-in input "S" of the third shifter 214, and the signal SHIN[15:8] is routed through the multiplexer 244 and the multiplexer 240 into the shift-in input "S" of the fourth shifter 216. In some embodiments, additional hardware is used to allow the 16-bit shifter seen in "Stage 2" and "Stage 3" to be simultaneously used as an independent 16-bit shifter; that is, independent of the shifters in "Stage 1" and "Stage 0."

Additionally, the first shifter and the second shifter, in certain configurations, shift independently of one another. The following is an example of an 8-bit operation: "Stage 0," the data input DATA[7:0] is routed through the multiplexer 230 and the multiplexer 220 into the data input "D" of the first shifter 210. The signal SHIN[7:0] is routed to the shift-in input "S" of the first shifter 210. For "Stage 1," the data input DATA[15:8] is routed through the multiplexer 232 and the multiplexer 222 into the data input "D" of the second shifter 212. The signal SHIN[23:16] can be routed to the shift-in input "S" of the second shifter 212. In some embodiments, additional hardware is used to allow all stages to operate simultaneously as independent 8-bit shifters routing the SHIN inputs to the correct shifters. The first shifter 210 can be configured to shift a binary number of the first width and the second shifter 212 can be configured to shift a binary number of the second width wherein the binary number of the first width and the binary number of the second width are different values. The first shifter 210 and the second shifter 212 can be configured to shift by different amounts.

In addition to the 32-bit configuration, dual 16-bit configuration, and quad eight-bit configurations, asymmetrical configurations are also possible. In embodiments, an eight-bit shifter and a 24-bit shifter may be configured. In some embodiments, multiplexers 220, 222, 224, and 226 represent a first level of multiplexers for the selectively combinable shifters while multiplexers 230, 232, 234, and 236 represent a second level of multiplexers for the selectively combinable shifters. Embodiments of the present concept can have additional levels to enable handing of larger operands, such as 64-bit shifts, 128-bit shifts, and so on. In some embodiments, the shifter stages, or selective combinations of shifter stages, are used at different times, i.e. in time multiplexing arrangements. In other embodiments, additional multiplexing are included so that the various SHIN inputs can be routed to the "S" inputs of the shifters so that differing shifts can be accomplished simultaneously with a shift-in function accomplished.

Figure 3:
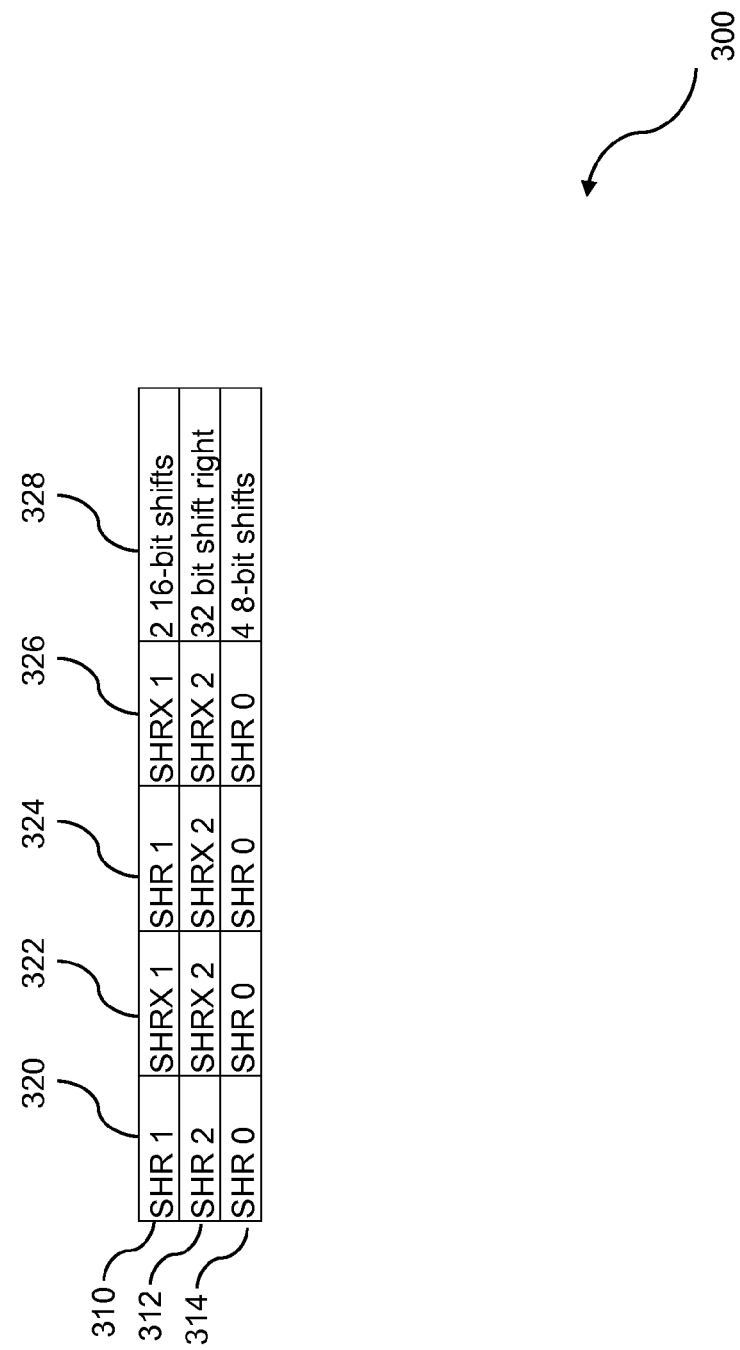
FIG. 3 shows example opcodes for controlling logic.

FIG. 3 shows a table 300 of example opcodes for controlling shifter logic. These opcodes can be used by processing elements connected to one or more of the shifters. The processing element may be connected to a shifter via control lines such as the shift control lines shown in previous diagrams. An opcode can allow configuration of the first shifter and the second shifter to enable shifting of the binary number of a third width. The SHR opcode is a shift right which forces the shift-in inputs to 0. The SHRX opcode is a shift right which honors the shift-in inputs. The top row 310 comprises opcodes for configuring two 16-bit shifts. In this example, the opcode in the first column 320 is a SHR 1, corresponding to the high byte stage of a first 16-bit shift configuration and corresponding to "Stage 3" as shown in FIG. 2. The opcode in the second column 322 is a SHRX 1, corresponding to the low byte stage of a first 16-bit shift configuration and corresponding to "Stage 2" as shown in FIG. 2. The opcode in the third column 324 is a SHR 1, corresponding to the high byte stage of a second 16-bit shift configuration and corresponding to "Stage 1" shown in FIG. 2. The opcode in the fourth column 326 is a SHRX 1, corresponding to the low byte stage of a second 16-bit shift configuration and corresponding to "Stage 0" as shown in FIG. 2. The fifth column 328 shows a description corresponding to each row.

The middle row 312 comprises opcodes for configuring a 32-bit shift. The opcode in the first column 320 is a SHR 2, corresponding to the fourth (highest-order byte) stage of a 32-bit shift configuration. The opcode in the second column 322 is a SHRX 2, corresponding to the third stage of a 32-bit shift configuration. The opcode in the third column 324 is a SHRX 2, corresponding to the second stage of a 32-bit shift configuration. The opcode in the fourth column 326 is a SHRX 2, corresponding to the first (lowest-order byte) stage of a 32-bit shift configuration.

For each of the exemplary embodiments illustrated in the table 300, the most significant byte of the shifter utilizes a SHR instruction, which pads zeros into the space emptied out by shifted data. However, it is possible to use a shift-in input for the most significant byte of a shifter. In those embodiments, the most significant byte shifter is also programmed with a SHRX opcode, along with all the lower order stages.

The bottom row 314 of the table comprises opcodes for configuring four eight-bit shifts. The opcode in the first column 320 is a SHR 0, corresponding to a first eight-bit shift configuration. The opcode in the second column 322 is a SHR 0, corresponding to a second eight-bit shift configuration. The opcode in the third column 324 is a SHR 0, corresponding to a third eight-bit shift configuration. The opcode in the fourth column 326 is a SHR 0, corresponding to a fourth eight-bit shift configuration.

The parameter following the opcode may correspond to the level used for performing a shift. For example, for a 16-bit shift, only the first level of multiplexers is used in certain shifting embodiments (hence, SHR 1 or SHRX1). In this case, the shift bits of the shift-control signals SHIFTX [4] that control the second level of multiplexers are set to zero.

Figure 4:
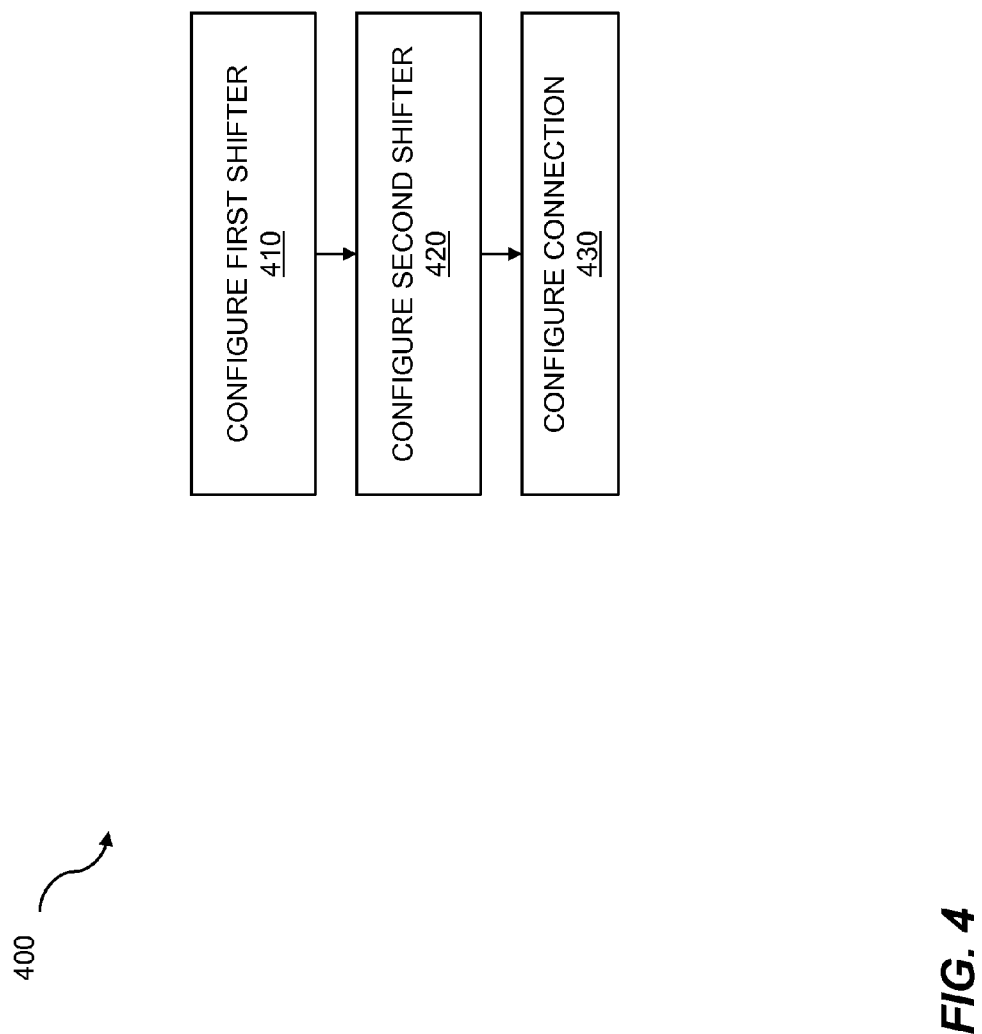
FIG. 4 is a flow diagram for configuring selectively combinable shifters.

FIG. 4 is a flow diagram for configuring selectively combinable shifters. A flow 400 can include configuring a first shifter 410 and configuring a second shifter 420. The flow 400 as shown continues with configuring the connection 430 between the first shifter and second shifter. The first shifter can be coupled to a first port that has a first width. The second shifter can be coupled to a second port that has a second width wherein the second shifter can be selectively coupled to the first shifter. The first port and the second port can be used in combination to handle input of a binary number of a third width wherein the third width is less than or equal to a sum of the first width and the second width. In embodiments, the first shifter is used in combination with the second shifter to shift the binary number of the third width. The configurations described in flow 400 can be accomplished using one or more processing elements connected to the shifters and logic by way of control lines.

Figure 5:
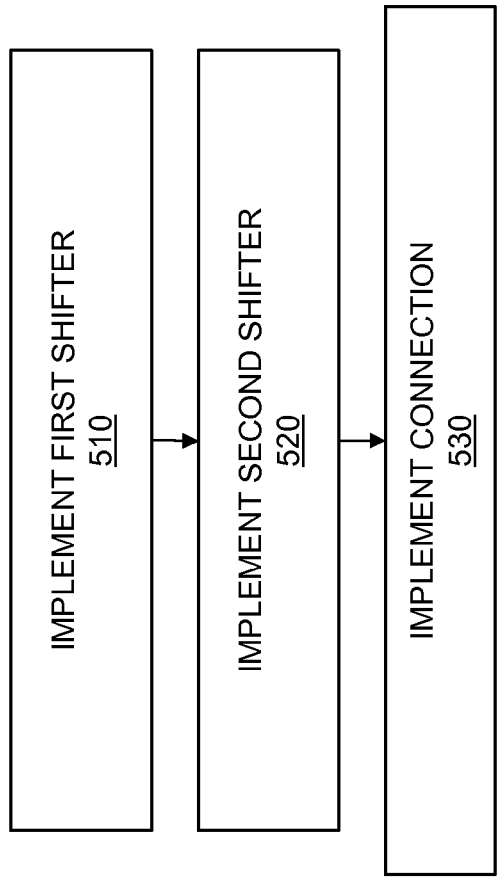
FIG. 5 is a flow diagram for implementing selectively combinable shifters.

FIG. 5 is a flow diagram for implementing selectively combinable shifters. A flow 500 is shown which can be implemented as part of a design automation routine for including and designing logic on a semiconductor chip. The flow 500 can include implementing a first shifter 510 coupled to a first port wherein the first port has a first width. As shown, the flow 500 further comprises implementing a second shifter 520 coupled to a second port, though other combinations of shifters and ports are also possible. The second port can have a second width. The flow 500 continues with implementing a connection 530 between the first shifter and the second shifter. The second shifter can be selectively coupled to the first shifter. The first shifter in combination with the second shifter can be used to shift the binary number of a third width. Various steps in the flow 500 may be changed in order, repeated, omitted, or the like without departing from the disclosed concepts. Various embodiments of the flow 500 may be included in a computer program product embodied in a non-transitory computer readable medium that includes code executable by one or more processors.

Figure 6:
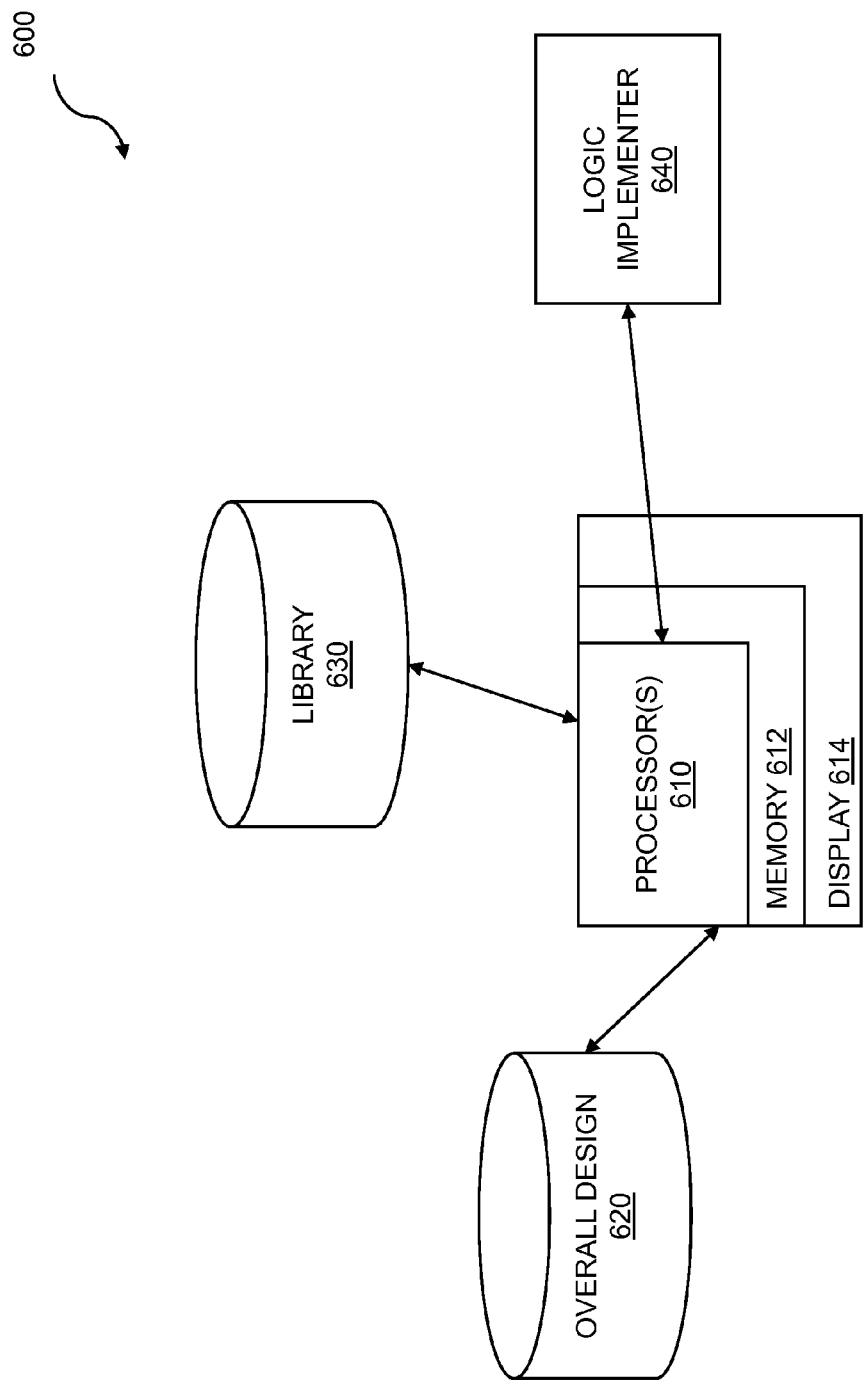
FIG. 6 is a system diagram for logic implementation.

FIG. 6 is a system diagram for logic implementation. A system 600 for logic implementation can comprise a memory 612 which stores instructions and one or more processors 610 coupled to the memory 612. The system 600 can include a display 614 and/or another human interface useful for providing direction to or receiving results from the system 600. The display 614 can be any electronic display, including but not limited to, a computer display, a laptop screen, a net-book screen, a tablet screen, a cell phone display, a mobile device display, a remote with a display, a television, a projector, or the like.

The processors 610 can import an overall design 620 and access both a library 630 and a logic implementer 640. In at least one embodiment, the logic implementer function is accomplished by the one or more processors 610. The system 600 can include a computer program product embodied in a non-transitory computer readable medium for implementation of a logical calculation apparatus comprising: code for implementing a first shifter coupled to a first port wherein the first port has a first width; code for implementing a second shifter coupled to a second port wherein: the second port has a second width; the second shifter can be selectively coupled to the first shifter; the first port and the second port can be used in combination to handle input of a binary number of a third width wherein the third width is less than or equal to a sum of the first width and the second width; and the first shifter in combination with the second shifter is used to shift the binary number of the third width.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. An apparatus for mathematical manipulation comprising:
   a first port coupled to a first shifter circuit wherein the first port has a first width;
   a second port coupled to a second shifter circuit wherein:
     the second port has a second width;
     the second shifter circuit is configured to be selectively coupled to the first shifter circuit;
     the first port and the second port are configured to be usable in combination to handle input of a binary number of a third width wherein the third width is less than or equal to a sum of the first width and the second width;
     the first shifter circuit in combination with the second shifter circuit are configured to be usable to shift the binary number of the third width; and
     the first shifter circuit is configured to shift a binary number of the first width and the second shifter circuit is configured to shift a binary number of the second width wherein the binary number of the first width and the binary number of the second width are different widths.

2. The apparatus of claim 1 wherein the first shifter circuit and the second shifter circuit are configured to be usable to shift by different amounts.

3. The apparatus of claim 1 wherein the first shifter circuit includes a barrel shifter.

4. The apparatus of claim 1 wherein the first shifter circuit includes configuration logic to enable simultaneous shifting of more than one bit.

5. The apparatus of claim 1 wherein the first shifter circuit and the second shifter circuit are configured to be usable to shift independently of one another.

6. The apparatus of claim 1 further comprising a first shift-in port for the first shifter circuit.

7. The apparatus of claim 6 wherein the first shifter circuit is configured to be usable to pad a shifted number with zeros.

8. The apparatus of claim 7 wherein the first shifter circuit, in combination with the second shifter circuit, is used to shift the binary number of the third width by a shift value greater than the second width.

9. The apparatus of claim 8 wherein the first shifter circuit, in combination with the second shifter circuit, pads the shifted number with zeros.

10. The apparatus of claim 1 further comprising a second shift-in port for the second shifter circuit.

11. The apparatus of claim 1 further comprising additional configuration logic to enable shifting of bits from the second shifter circuit to the first shifter circuit.

12. The apparatus of claim 1 wherein an opcode is used to configure the first shifter circuit and the second shifter circuit to enable shifting of the binary number of the third width.

13. The apparatus of claim 1 further comprising a processing element to control at least the first shifter circuit.

14. The apparatus of claim 1 further comprising a processing element to control at least the second shifter circuit.

15. A method of logical calculation comprising:
   configuring a first shifter circuit and a second shifter circuit wherein:
     the first shifter circuit is coupled to a first port that has a first width;
     the second shifter circuit is coupled to a second port that has a second width wherein:
       the second shifter circuit is configured to be selectively coupled to the first shifter circuit;
       the first port and the second port are configured to be usable in combination to handle input of a binary number of a third width wherein the third width is less than or equal to a sum of the first width and the second width;
       the first shifter circuit in combination with the second shifter circuit are configured to be usable to shift the binary number of the third width; and
       the first shifter circuit is configured to shift a binary number of the first width and the second shifter circuit is configured to shift a binary number of the second width wherein the binary number of the first width and the binary number of the second width are different widths.

16. A computer implemented method for implementation of a logical calculation apparatus comprising:
   implementing a first shifter circuit coupled to a first port included in logic on a semiconductor chip, wherein the first port has a first width;
   implementing a second shifter circuit coupled to a second port included in the logic on a semiconductor chip, wherein:
     the second port has a second width;
     the second shifter circuit is configured to be selectively coupled to the first shifter circuit;
     the first port and the second port are configured to be usable in combination to handle input of a binary number of a third width wherein the third width is less than or equal to a sum of the first width and the second width;
     the first shifter circuit in combination with the second shifter circuit are configured to be usable to shift the binary number of the third width; and
     the first shifter circuit is configured to shift a binary number of the first width and the second shifter circuit is configured to shift a binary number of the second width wherein the binary number of the first width and the binary number of the second width are different widths.

17. A computer program product embodied in a non-transitory computer readable medium for implementation of a logical calculation apparatus, the computer program product comprising code which causes one or more processors to perform operations of:
    implementing a first shifter circuit coupled to a first port included in logic on a semiconductor chip, wherein the first port has a first width;
    implementing a second shifter circuit coupled to a second port included in the logic on a semiconductor chip, wherein:
        the second port has a second width;
        the second shifter circuit is configured to be selectively coupled to the first shifter circuit;
        the first port and the second port are configured to be usable in combination to handle input of a binary number of a third width wherein the third width is less than or equal to a sum of the first width and the second width;
        the first shifter circuit in combination with the second shifter circuit are configured to be usable to shift the binary number of the third width; and
        the first shifter circuit is configured to shift a binary number of the first width and the second shifter circuit is configured to shift a binary number of the second width wherein the binary number of the first width and the binary number of the second width are different widths.

18. A computer system for implementation of a logical calculation apparatus comprising:
    a memory which stores instructions;
    one or more processors coupled to the memory wherein the one or more processors are configured to:
        implement a first shifter circuit coupled to a first port included in logic on a semiconductor chip, wherein the first port has a first width;
        implement a second shifter circuit coupled to a second port included in the logic on a semiconductor chip, wherein:
            the second port has a second width;
            the second shifter circuit is configured to be selectively coupled to the first shifter circuit;
            the first port and the second port are configured to be usable in combination to handle input of a binary number of a third width wherein the third width is less than or equal to a sum of the first width and the second width;
            the first shifter circuit in combination with the second shifter circuit are configured to be usable to shift the binary number of the third width; and
            the first shifter circuit is configured to shift a binary number of the first width and the second shifter circuit is configured to shift a binary number of the second width wherein the binary number of the first width and the binary number of the second width are different widths.

\* \* \* \* \*